United States Patent [19]
Worger et al.

[11] Patent Number: 5,664,113
[45] Date of Patent: Sep. 2, 1997

[54] WORKING ASSET MANAGEMENT SYSTEM AND METHOD

[75] Inventors: William Robert Worger, Gilbert; Roman Casimir Lopatynski, Scottsdale; Steven Peter Allen, Mesa; Gerald Vincent Piosenka, Scottsdale, all of Ariz.

[73] Assignee: Motorola, Inc., Schaumburg, Ill.

[21] Appl. No.: 166,326

[22] Filed: Dec. 10, 1993

[51] Int. Cl.$^6$ ................................................ G06F 7/00
[52] U.S. Cl. ............................................................ 705/28
[58] Field of Search ........................... 364/400, 401, 364/407, 408; 235/382.25; 340/825.31, 825.25, 825.34, 825.5, 825.36, 38, 870.28, 825.54

[56] References Cited

U.S. PATENT DOCUMENTS

| 4,180,204 | 12/1979 | Koenig | 235/385 |
|---|---|---|---|
| 4,673,932 | 6/1987 | Ekchian | 340/825.54 |
| 4,688,026 | 8/1987 | Scribner | 340/572 |
| 4,739,328 | 4/1988 | Koelle et al. | 342/44 |
| 4,746,830 | 5/1988 | Holland | 310/313 |
| 4,827,395 | 5/1989 | Anders et al. | 364/138 |
| 4,837,568 | 6/1989 | Snapper | 340/825.54 |
| 4,839,631 | 6/1989 | Tsuji | 340/541 |
| 4,862,724 | 9/1989 | Ekchian et al. | 340/825.54 |
| 4,881,061 | 11/1989 | Chambers | 340/568 |
| 4,935,724 | 6/1990 | Smith | 340/551 |
| 4,965,821 | 10/1990 | Bishop et al. | 379/91 |
| 4,982,070 | 1/1991 | Bezin et al. | 235/378 |
| 5,005,125 | 4/1991 | Farrar et al. | 364/403 |
| 5,058,044 | 10/1991 | Stewart et al. | 364/551.01 |
| 5,091,856 | 2/1992 | Hasegawa et al. | 364/424 |
| 5,151,684 | 9/1992 | Johnsen | 340/572 |
| 5,266,944 | 11/1993 | Carroll et al. | 340/825.36 |
| 5,289,369 | 2/1994 | Hirshberg | 364/401 |
| 5,291,399 | 3/1994 | Chaco | 364/413.02 |
| 5,455,851 | 10/1995 | Chaco | 379/38 |
| 5,465,082 | 11/1995 | Chaco | 340/825.54 |

Primary Examiner—Gail O. Hayes
Assistant Examiner—Felicia Ives
Attorney, Agent, or Firm—Frederick M. Fliegel

[57] ABSTRACT

Working assets (26) are equipped with ID tags (56) that respond to interrogations from interrogators (50). Each interrogated tag (56) sends response codes that identify the tag (56) and working asset (26), can describe an amount of use experienced by the working asset (26), and can describe unused capacity available for holding a consumable commodity, such as fuel. Interrogators (50) are positioned at normally closed portals (40, 42, 62, 64) of staging areas (22, 24). A database (94) contains information concerning working assets (26), users (28) to whom working assets (26) have been assigned, and caretakers (38) who may be authorized to transport various working assets (26). The caretakers (38) also have ID tags (58). A portal (40, 42, 62, 64) temporarily opens or remains closed in response to the interrogation that takes place at the portal (40, 42, 62, 64) and data stored in the database (94).

44 Claims, 8 Drawing Sheets

WORKING ASSET MANAGEMENT SYSTEM AND METHOD

TECHNICAL FIELD OF THE INVENTION

The present invention relates generally to the operation and management of working assets, such as inventories or fleets of rental or corporate vehicles, construction or manufacturing equipment, tools, etc.

BACKGROUND OF THE INVENTION

Working assets represent equipment which perform particular jobs for an organization and for which an organization is responsible. An organization's working assets may include, e.g., vehicles, machines, equipment, tools, etc. While working assets may be held out for sale to others and may eventually be sold to others, they need not be kept in a new, unused condition. Rather, an organization may temporarily assign or check out its working assets to various users so that the users can use the working assets.

An organization often feels a need to maintain its working assets in a proper operational condition. Maintenance may range from simple cleaning tasks, to preventive maintenance, to repair. Proper maintenance insures that the working assets continue to satisfactorily perform the jobs for which they are intended. Proper maintenance also enhances the value of the organization by preserving the value of the working asset itself and by nurturing a desirable image for the organization.

In addition, an organization often feels a need to respect the time spent by those who use the working assets. This need is particularly strongly felt in connection with rental organizations because the working asset users are customers, and future revenues to the organization may depend upon providing good customer service. But, all kinds of organizations, whether rental or otherwise, need to respect the time spent by working asset users because the high cost of labor urges the organizations to efficiently use their labor forces.

An organization often feels a need to provide security for its working assets. An organization's inventory of working assets represents a target to thieves and pilferers. The consequences of the theft or pilferage of working assets can be particularly serious when the working assets are expensive ones, such as vehicles or construction equipment.

Moreover, an organization often feels a need to maintain current and accurate information describing locations for its working assets. When working assets are mobile or portable, as in the case of vehicles, various items of construction and manufacturing equipment, and many tools, organization losses result from misplacing, losing, or otherwise being unable to quickly find working assets when needed.

Attempts have been made to adapt modern inventory management techniques to the management of working assets. For example, data describing working assets are routinely collected in databases and processed by computers.

Conventional automated information collection systems used by modern inventory management systems are ineffective in connection with working assets. Conventional automated information collection systems are frequently adapted for use with inventories of retail and like goods rather than working assets. Thus, they typically obtain information related only to the identity of the goods and possibly a location of the goods. They may optionally rely upon an electronic article surveillance (EAS) system for some degree of security. Typically, they rely heavily upon point of sale (POS) terminals where particular goods are associated with particular customers, where information used to adjust inventory databases is automatically obtained, and where EAS devices associated with the goods are disabled.

Often, POS terminals are either not used in connection with assigning working assets to users or they are remotely located from the working assets when an assignment takes place. Consequently, numerous opportunities for mistakes in collecting information and arranging security are presented between an assignment of a working asset to a user and the user's actual possession and use of the working asset. Moreover, working assets are usually returned and user assignments revoked, a task which conventional POS terminals perform incompletely, inefficiently, or not at all. And, conventional automated information collection systems, such as POS terminals, have no automated way to obtain information which relates to working asset maintenance, working asset use, etc.

Due at least in part to the inadequacies of conventional automated information collection systems, the needs associated with the management of working assets have been addressed for better or worse through the implementation of systems and procedures that rely heavily upon human detection, human reporting, and human action. Typically, maintenance is performed either in accordance with a schedule or when involved persons report particular problems. Unfortunately, a schedule does not reflect the individual status of an individual working asset. Moreover, a user of an organization's working asset may not be motivated to notice or report particular problems. Security is often provided by human guards who may occasionally fail to notice an act of thievery or pilferage or may occasionally fail to take effective action. Location information is often provided by relying on personnel who are poorly motivated or poorly trained in organizational procedures. Such personnel are typically asked to make repetitive, accurate, and timely reports concerning their involvement with working assets. Such reports are routinely inaccurate, incomplete, and stale.

Consequently, conventional inventory management techniques are slow, inaccurate, and inefficient when applied to working assets. The conventional techniques lead to stolen, lost, or misplaced working assets, a lack of coordination between organization members involved with the assets, and a poor ability to make working assets meet user needs.

SUMMARY OF THE INVENTION

Accordingly, it is an advantage of the present invention that an improved method and system for managing working assets are provided.

Another advantage of the present invention is that identification tags are attached to working assets to automatically communicate information to a database when the assets enter and leave various staging areas.

Another advantage of the present invention is that an inventory of working assets is tightly controlled so that current and accurate data concerning the working assets, their status, and their locations are likely to be instantly available.

Another advantage of the present invention is that an identification tag is provided that communicates information concerning the operation of a working asset in addition to identification data.

Another advantage of the present invention is that a method and system are provided that improve security for working assets.

The above and other advantages of the present invention are carried out in one form by a method of operating an identification tag to control an inventory of monitored working assets. This method calls for coupling a monitoring system for one of the working assets to the tag. Use information is obtained from the monitoring system. The use information describes a quantity of use experienced by the one working asset. An interrogation signal is received. In response to this interrogation signal, the use information is transmitted.

The above and other advantages of the present invention are carried out in another form by a method of controlling an inventory of working assets. The method calls for physically associating an identification tag with each working asset in the inventory of working assets. At least a portion of the inventory is located in a staging area having a normally closed portal. A selected one of the working assets is assigned to a user. One of the tags is interrogated. The interrogated tag is associated with a working asset positioned at the portal. The interrogation is performed to identify the working asset. If the working asset at the portal is the selected one of the working assets, the portal is temporarily opened.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
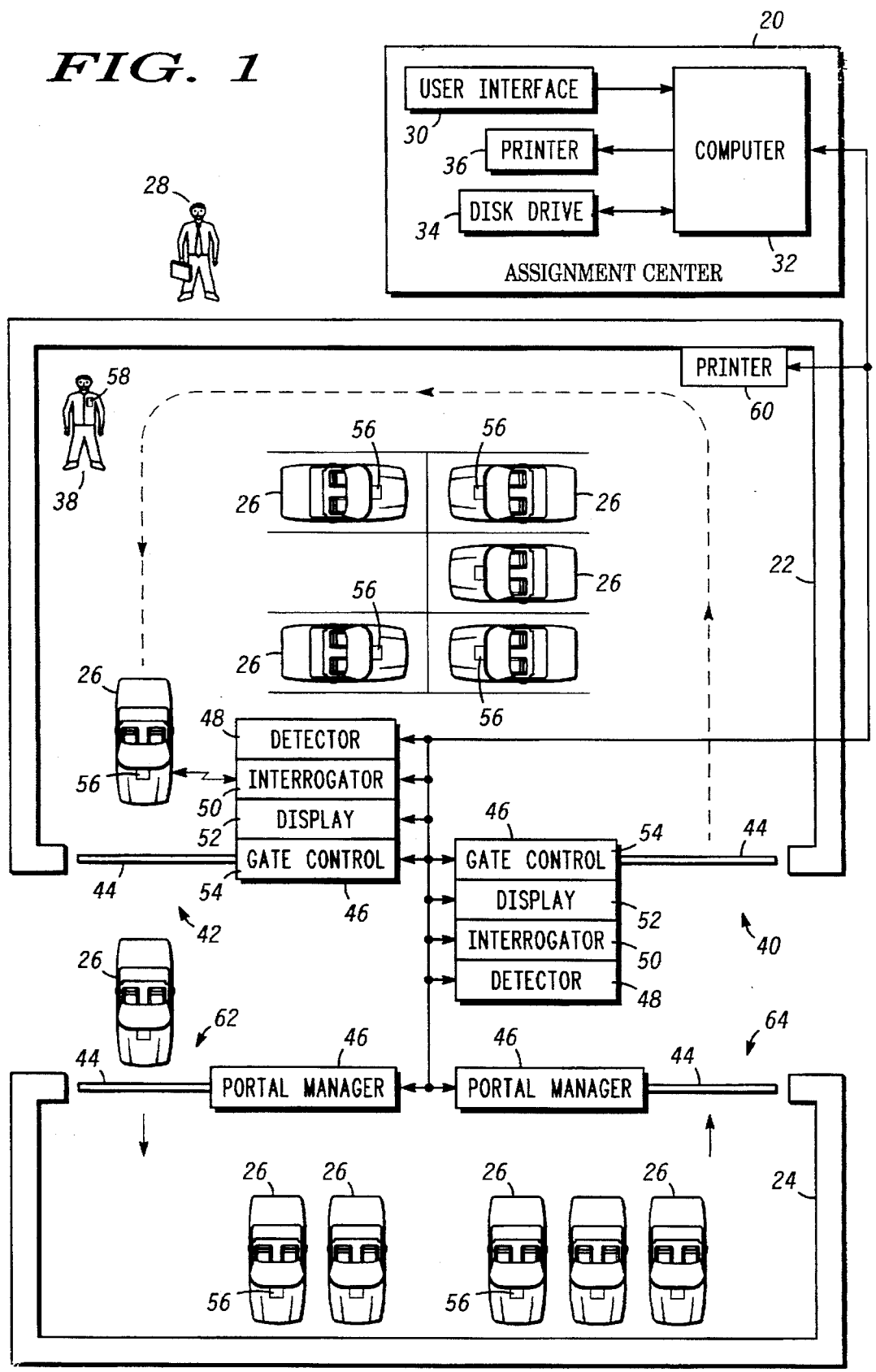
FIG. 1 is a schematic layout diagram that exemplifies organizational facilities with which the system and method of the present invention may operate.

FIG. 1 is a simplified schematic layout diagram exemplifying organizational facilities to which the system and method of the present invention may be applied. These facilities may include one or more assignment centers 20, one or more public staging areas 22, and one or more private staging areas 24.

Assignment center 20 represents a place where data are gathered for use in assigning working assets 26 to users 28. Assignment center 20 may, but need not, be located remotely from public and private staging areas 22 and 24. User interface 30 to computer 32 is located at assignment center 20. Computer 32 and associated disk drive system 34 and printer 36 may also be located at assignment center 20 for convenience. User interface 30 is used in collecting data from users 28 and others, disk drive system 34 is used to store a database (discussed below) of information about working assets 26, users 28, and other items. Printer 36 is used, among other things, to print rental contracts or other papers which may evidence the assignments of working assets 26 to users 28. Computer 32, user interface 30, disk drive system 34, and printer 36 all represent well known computer devices.

Public staging area 22 represents a controlled access place where working assets 26 are temporarily held pending their assignment to users 28 or their movement by caretakers 38. Public staging area 22 may hold any quantity of working assets 26. FIG. 1 illustrates working assets 26 as being motor vehicles. Thus, public staging area 22 may represent a controlled access parking lot or a ready lot as used by vehicle rental organizations. Working assets 26 that are motor vehicles held in the inventory of a rental organization represent one preferred embodiment of the present invention. However, the present invention is not limited to use only in connection with motor vehicle working assets 26 or rental organizations. Working assets 26 may represent any construction equipment, manufacturing equipment, tools, trailers, computers, machines or other items for which an organization is responsible and which are temporarily assigned to users. For that reason, public staging area 22 may alternatively be a garage, warehouse, yard, room, building or other storage area to which access may be controlled. Moreover, working assets 26 need not be held out for rent, but may simply be held in an organization's fleet or other inventory.

Access to public staging area 22 is controlled so that an attempted transport of working asset 26 into or out from area 22 will be noticed. This access control is provided in the FIG. 1 embodiment through entry portal 40 and exit portal 42. However, alternative embodiments could arrange a single portal to control both ingress and egress. Portals 40 and 42 each include gate 44 and portal manager 46. Portal manager 46 operates gate 44 so that portals 40 and 42 remain in a normally closed condition. Thus, entry into and exit from area 22 is normally prevented. However, in various specific situations, discussed in more detail below, portals 40 and 42 temporarily open to permit passage.

Portal managers 46 each include detector 48, interrogator 50, display 52 and gate controller 54. Each of detector 48, interrogator 50, display 52, and gate controller 54 couple to computer 32 through a suitable data communication interface. Detector 48 detects the presence of working asset 26 positioned to pass through its respective portal 40 or 42. Detector 48 may use a switch or an optical, magnetic or other sensing device to detect the presence of working asset 26 positioned to pass through portal 40 or 42. When working asset 26 is detected, detector 48 sends a signal to computer 32 and computer 32 responds by activating interrogator 50.

Interrogator 50 interrogates any working asset identification (ID) tags 56 which may be present at the respective portal 40 or 42. Tags 56 are radio frequency (RF) transponders, discussed in more detail below in connection with FIGS. 2-3. Each working asset 26 to be controlled in accordance with the present invention has tag 56 physically associated with it. By interrogating tag 56, interrogator 50 conducts a communication session with tag 56.

In addition, caretaker identification tags 58 are physically associated with caretakers 38. Caretakers 38 represent persons or equipment configured to transport working assets 26.

In a vehicle rental organization, caretakers 38 are typically organization employees who move the vehicles from lot to lot as needed and who maintain the vehicles. In the preferred embodiment, caretaker tags 58 are RF transponders similar in configuration to working asset tags 56. Thus, interrogator 50 conducts a communication session with any caretaker tags 58 that may be in the vicinity of portal 40 or 42 when working asset tag 56 is being interrogated. However, in alternative embodiments, caretaker tags 58 may be conventional bar coded or otherwise optically or magnetically scanable tags that may be read by a card reader to provide computer 32 with the identification data stored thereon.

Display 52 represents a device which annunciates instructions perceivable by user 28 or caretaker 38 located with working asset 26 positioned to pass through portal 40 or 42. Preferably, display 52 visually presents these instructions, but the instructions may alternatively be presented audibly. The instructions may tell user 28 or caretaker 38 to proceed when passage through portal 40 or 42 has been approved. The instructions may tell user 28 or caretaker 38 what actions to take when passage is denied. Data annunciated from display 52 are provided by computer 32.

Gate controller 54 is activated by computer 32 to open gate 44. Opening gate 44 opens the respective portal 40 or 42. Gate controller 54 may be configured to automatically close gate 44 after working asset 26 passes through the portal, or gate controller 54 may simply respond to closing instructions provided by computer 32.

A printer 60 may desirably be located somewhere in public staging area 22. Printer 60 couples to computer 32 through a suitable data communication interface. Printer 60 is provided so that information, such as receipts etc., may be obtained directly in area 22. User 28 or caretaker 38 may not then need to return to assignment center 20, which may be remotely located from area 22, in many situations.

Private staging area 24 may be remotely located from either assignment center 20 or public staging area 22. However, for the purposes of the present invention private staging area 24 may be configured similarly to public staging area 22. Thus, private staging area 24 represents a controlled access place where working assets 26 are temporarily held. Access control is provided by private entrance portal 62 and private exit portal 64. Each of portals 62 and 64 is controlled by gate 44 and portal manager 46. Gate 44 and portal manager 46 are configured substantially as discussed above, and portal manager 46 couples to computer 32 through a suitable data communication interface. Private staging area 24 represents a maintenance garage, holding lot etc. Private staging area 24 holds overflow working assets 26 from public staging area 22, and private area 24 is used in performing maintenance on working assets 26. Maintenance may range from simple cleaning tasks, to preventive maintenance, to repair. Desirably, for security purposes only caretakers 38 are permitted to transport working assets 26 out from private staging area 24.

Figure 2:
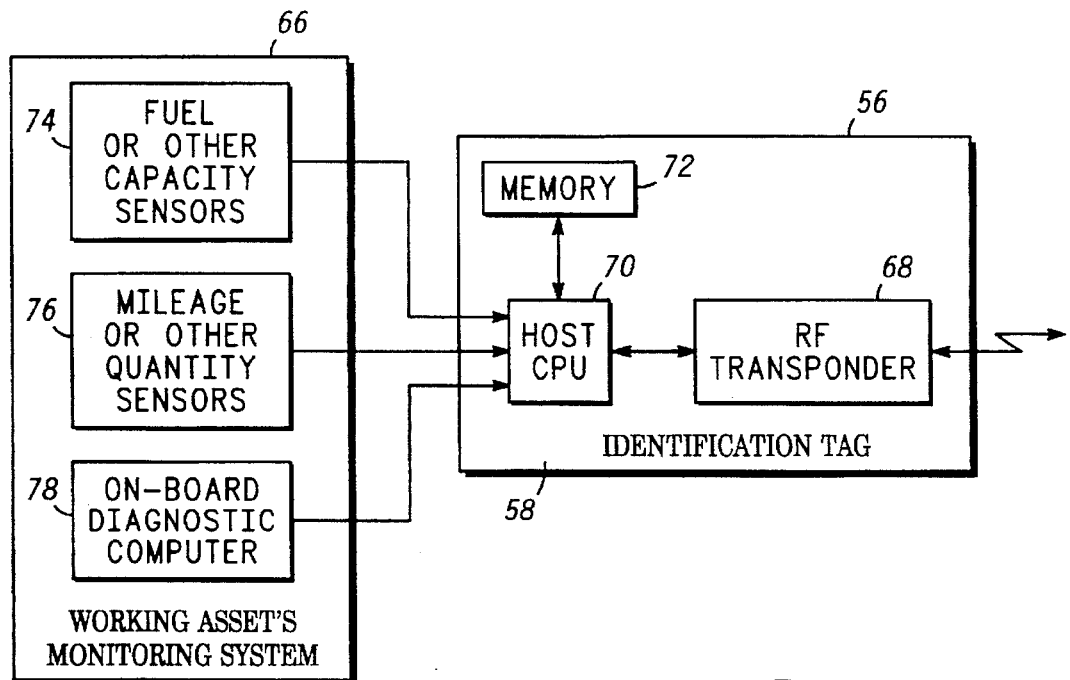
FIG. 2 is a block diagram of an identification tag configured in accordance with the present invention and coupled to a working asset's monitoring system.

FIG. 2 is a block diagram of RF transponding identification tag 56 coupled to monitoring system 66 of working asset 26 (FIG. 1). As discussed above, tag 58 may also be an RF transponding tag. If so, the FIG. 2 block diagram likewise describes tag 58. For purposes of clarity, this tag will be referred to below as tag 56, but those skilled in the art will appreciate that this discussion may also relate, at least in part, to tag 58.

Tag 56 may be either an active or passive ID tag. Tag 56 includes RF transponder 68, which down-converts received RF communication signals to baseband. The received RF communication signals result from an interrogation typically initiated by interrogator 50 (FIG. 1). In addition, RF transponder 68 modulates a carrier signal or an impedance to effect a transmission. The transmission communicates data back to interrogator 50.

Transponder 68 couples to host central processing unit (CPU) 70. CPU 70 obtains the received baseband signals from transponder 68, and CPU 70 provides data that control the transmission modulations performed by transponder 68. CPU 70 may, but need not, be embodied in a conventional microprocessor circuit. CPU 70 also couples to memory 72. Memory 72 stores a unique identifying code associated with each tag 56 and programming instructions that define the tasks performed by CPU 70 and tag 56. In a preferred embodiment, memory 72 also saves data obtained during either the operation of working asset 26 (FIG. 1) or an interrogation from interrogator 50. Desirably, memory 72 is a non-volatile memory that supports both reading and writing operations.

In the preferred embodiment, one or more of working assets 26 (FIG. 1) are equipped with monitoring system 66. Monitoring systems 66 are commonly included with relatively expensive working assets 26 and working assets 26 that must be maintained for proper operation and long life. For example, monitoring system 66 for motor vehicles senses fuel level, mileage, engine temperature, electrical system voltage, operational status etc.

In a preferred embodiment of the present invention, fuel or other capacity sensor 74 of monitoring system 66 couples to host CPU 70 of ID tag 56. Capacity sensor 74 provides signals or other capacity information that indicates the working asset's remaining capacity for holding a consumable commodity used by the working asset. For a motor vehicle, this consumable commodity may relate to the energy used in causing the vehicle to travel. The energy may be contained in fuel held in a fuel tank or the energy may be electricity held in a battery.

A mileage or other quantity of use sensor 76 of monitoring system 66 also couples to host CPU 70 of ID tag 56. Quantity sensor 76 provides signals or other use information that indicates a quantity of use experienced by the working asset. For a motor vehicle, this use information typically indicates mileage. However, for other types of machinery this use information typically indicates hours of operation.

A working asset's on-board computer 78 also couples to CPU 70. Working assets 26 equipped with on-board computer 78 typically perform diagnostic tests or monitoring indicating working asset 26 operational status. Many types of operational problems are detected by computer 78. Thus, on-board computer 78 provides operational status information indicating whether working asset 26 needs maintenance.

Figure 3:
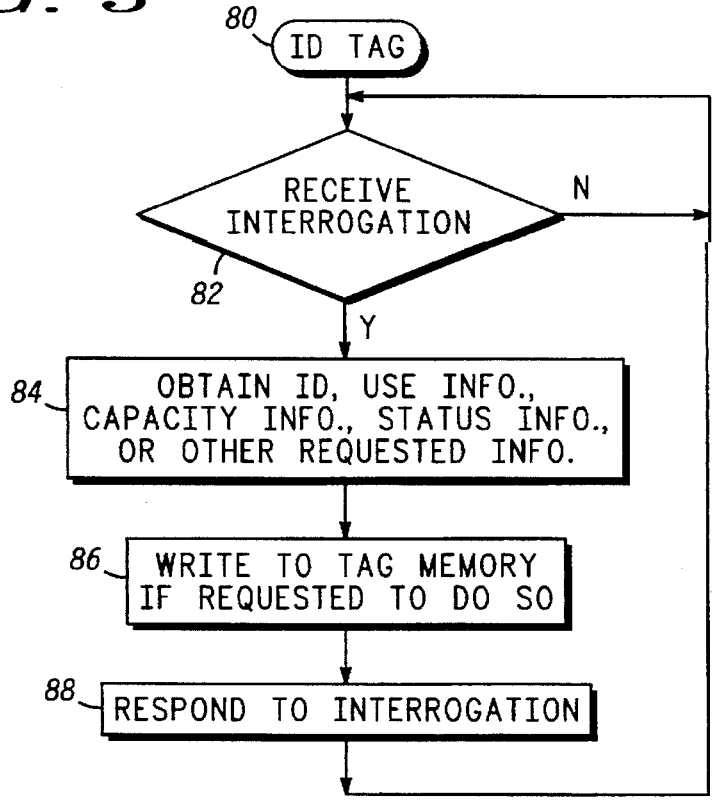
FIG. 3 is a flow chart of tasks performed by the identification tag.

FIG. 3 is a flow chart of ID tag procedure 80 performed by ID tag 56. Procedure 80 includes tasks that may be controlled by CPU 70 (FIG. 2) under the influence of programming instructions stored in memory 72. Procedure 80 performs query task 82 to determine whether an interrogation has been received. An interrogation is typically initiated by interrogator 50 (FIG. 1). The interrogation may be generally directed to any tag 56 which may be within range of interrogator 50, or interrogator 50 may broadcast an interrogation signal that identifies only specific tag 56 or class of tags 56 which should respond. When task 82 determines that no interrogation has occurred, or an interrogation has occurred to which tag 56 should not respond, program flow remains at task 82.

When task 82 determines that an interrogation to which tag 56 should respond has occurred, task 84 is performed. Task 84 obtains the tag's ID code and any use information, capacity information, operational status information or other information requested by the interrogation. Referring temporarily back to FIG. 2, the ID code may be obtained from memory 72. The use information may be obtained from quantity sensors 76, the capacity information may be obtained from capacity sensor 74, and the operational status information may be obtained from on-board computer 78.

The FIG. 3 flow chart suggests that use, capacity, status and other information may be obtained after an interrogation has been initiated. However, those skilled in the art will appreciate that alternative embodiments may perform a background procedure to continuously monitor these items of information, and store the results in memory 72. Thus, memory 72 may alternatively contain a log of this information, or at least the most current versions of this information for use by task 84.

After task 84 obtains the information requested by the interrogation, task 86 performs any write operations to memory 72 that may be requested by the interrogation. Thus, the interrogation signal may download data to tag 56, and that downloaded data may be saved in memory 72. Prior downloaded data may be included in the data requested by the interrogation signal and obtained above in task 84.

After task 86, task 88 responds to the interrogation. CPU 70 (FIG. 2) feeds data to transponder 68 that controls how transponder 68 modulates a carrier signal or an impedance. This modulation is detected at interrogator 50 using conventional techniques. These data are referred to as interrogation response codes herein. The communication of data back to interrogator 50 (FIG. 1) may include a specific set of data for all interrogations, or it may alternatively include only the specific items of data requested by the interrogation to which task 88 responds. After task 88, program control loops back to task 82 to await the next interrogation.

Accordingly, ID tag procedure 80 causes ID tag 56 to communicate its unique identifying code to interrogator 50 (FIG. 1) when interrogated. In addition, ID tag 56 may perform a variety of other tasks when it experiences an interrogation. For example, it may store data communicated to it by the interrogation. In addition, tag 56 may obtain information provided by the working asset's monitoring system 66 (FIG. 2) and communicate this information back to interrogator 50.

Those skilled in the art will appreciate that care is exercised in the present invention to prevent interference between multiple ones of tags 56 or 58 that may respond to a single interrogation. Adjusting the power levels and directionality of interrogators 50 in cooperation with the location of tags 56 on working assets 26 and the location of portals 40, 42, 62, and 64 (FIG. 1) serves to reduce the chances of any interference. Interference between working asset tags 56 and caretaker tags 58 may be reduced by requiring caretaker tags 58 to use optical, magnetic or other non-interfering communication techniques. Alternatively, interrogations may instruct only working asset tags 56 to respond to a first interrogation and only caretaker tags 58 to respond to a second interrogation, and each "interrogation" may actually include separate working asset and caretaker sessions. Moreover, tags 56 and 58 may implement a frequency division multiple access (FDMA) and/or time division multiple access (TDMA) scheme to minimize the chances of interference.

Figure 4:
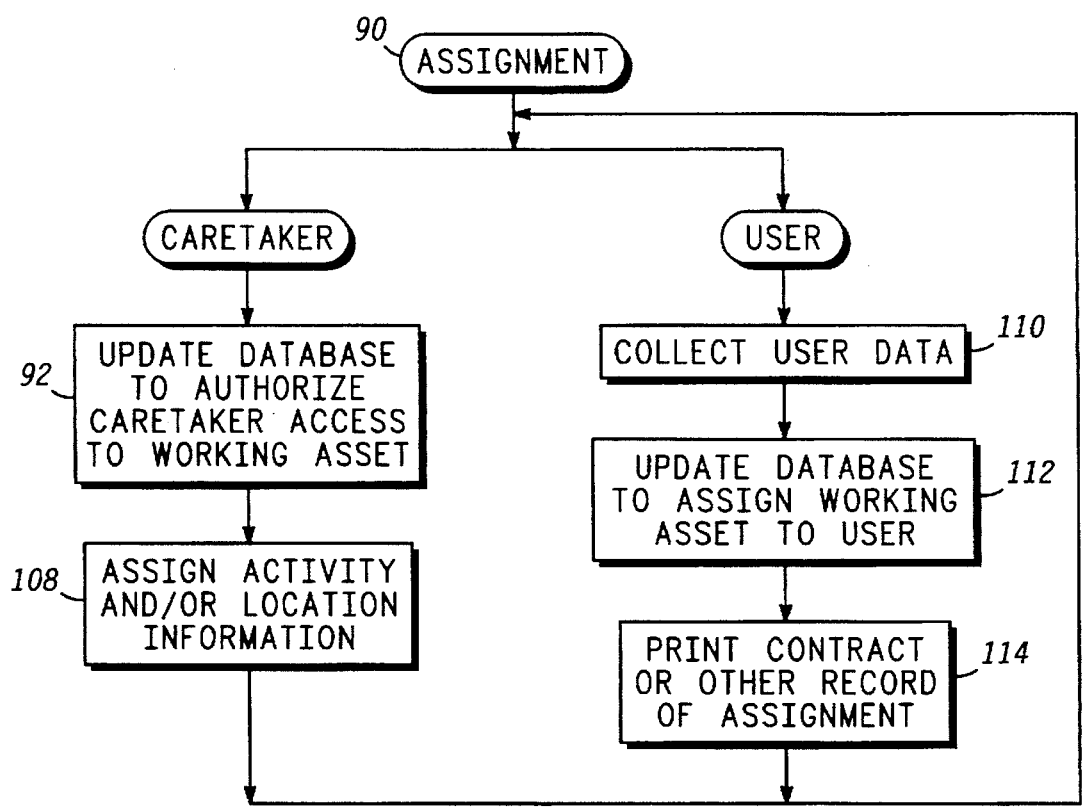
FIG. 4 is a flow chart of an assignment procedure performed to assign working assets.

FIG. 4 is a flow chart of assignment procedure 90 performed through computer 32 and disk drive 34 (FIG. 1) to assign working assets 26 and to maintain a database for working assets 26. Procedure 90 encompasses conventional database manipulation techniques. Procedure 90 is performed, e.g., when user 28 desires to obtain working asset 26. Likewise, procedure 90 may be performed when managers or other operators of the inventory of working assets 26 assign various jobs or activities to various caretakers 38.

When assignment procedure 90 is used to assign jobs or activities to caretakers 38, task 92 updates a database to authorize caretaker 38 to have access to working asset 26. Task 92 may authorize single caretaker 38 to access multiple working assets 26, and/or task 92 may authorize multiple caretakers 38 to access single working asset 26.

Figure 5:
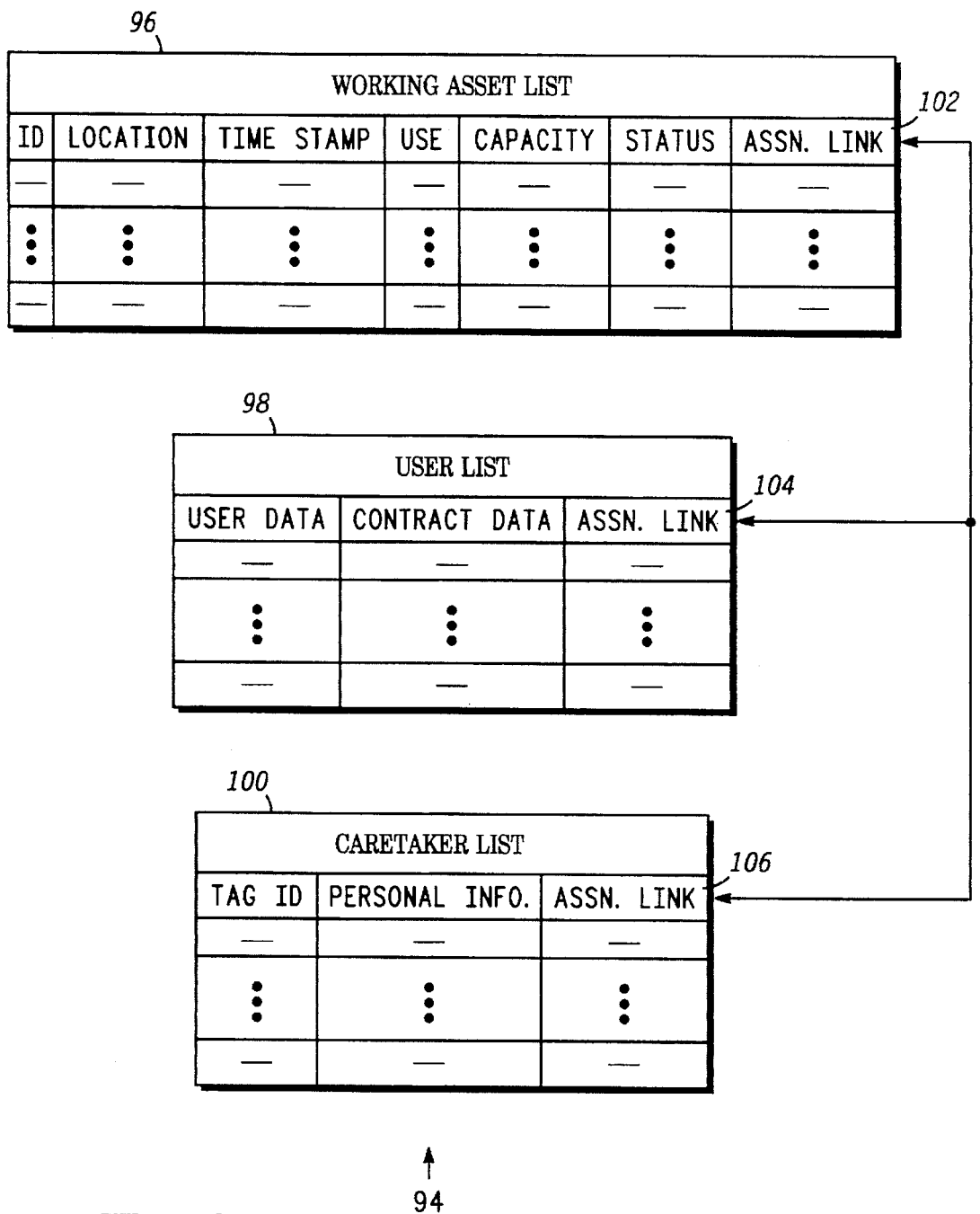
FIG. 5 is a block diagram of a database in which data concerning working assets, working asset users, and working asset caretakers are stored.

FIG. 5 is an exemplary block diagram of database 94 in which data concerning working assets 26, users 28 and caretakers 38 are stored. Database 94 may include, e.g., working asset list 96, user list 98 and caretaker list 100.

Working asset list 96 includes data that relate to the various working assets 26 controlled in accordance with the system and method of the present invention. Such data may include, e.g., the unique identification code of the tag 56 (FIG. 1) physically associated with working assets 26. In addition, list 96 may include location data for the working assets 26. The location data may indicate current locations for working assets 26 and permitted future locations that describe where working assets 26 are permitted to go. Location data may describe particular staging area 22 or 24, or location data may indicate an "out-of-lot" location. One or more time stamps may be included to define the staleness of the working asset's data records. List 96 may additionally include quantity of use information, capacity information, and operational status information obtained from tags 56, as discussed above in connection with FIGS. 2-3. Moreover, list 96 may include assignment link data 102, which indicate which users 28 or caretakers 38 have been assigned or authorized to have the working asset. Of course, those skilled in the art will appreciate that additional information, such as vehicle identification, maintenance records, rental rates etc., (not shown) may also be included in list 96.

User list 98 includes information that relates to various users 28 to whom working assets 26 have been assigned (e.g., user data that identify user 28, user's driver license, address, etc.). Contract data may also be included. Contract data, which may be particularly pertinent in a rental organization, may identify credit card numbers, specifically quoted rental rates, insurance coverage etc. Moreover, list 98 may include assignment link data 104. Assignment link data 104 identify which working asset 26 from working asset list 96 has been assigned to user 28.

Caretaker list 100 includes information that relates to various caretakers 38. Tag ID information may contain data codes corresponding to the data codes obtained from caretaker tags 58 (FIG. 1) during an interrogation. Personal information may identify the caretaker's name, address, employee number etc., and may contain statistical data that characterize the caretaker's performance. Assignment link data 106 may be included to identify the one or more working assets 26 that each caretaker 38 has been authorized to transport.

Referring back to FIG. 4, task 92 may establish assignment links 102 and 106 (FIG. 5) to authorize caretaker 38 to transport one or more working assets 26. Desirably, task 92 checks to determine whether lists 96 and 98 already assign working asset 26 to user 28 and refrain from altering such assignments or from adding caretaker authorizations to such assignments. After task 92, task 108 may update database 94 to assign particular activity and/or location information (e.g., task 108 may establish a future location for a working asset in a particular public staging area 22 (FIG. 1) or a particular private staging area 24). After task 108, program control waits until another assignment is needed.

Assignment procedure 90 additionally assigns particular working assets 26 to users 28. When working asset 26 is to be assigned to user 28, task 110 is performed to collect user data for storage in user list 98 (FIG. 5). User data may be collected through user interface 30 (FIG. 1). Such user data identify the user and all other factors, such as credit card data, pricing etc., which may be needed by an organization prior to assigning working asset 26 to user 28.

After task 110, task 112 updates database 94 (FIG. 5) to assign a particular working asset to the user 28. The assignment may be activated by establishing links 102 and 106. Desirably, task 112 overwrites any existing authorizations between caretaker 38 and the selected working asset 26 being assigned in task 112. Thus, task 112 prevents caretaker 38 from being authorized to transport the selected working asset 26. This task prevents caretaker 38, who may have earlier been authorized to transport working asset 26, from transporting the working asset 26 between the time when assignment to user 28 is made and the time when the user 28 takes possession of the working asset 26.

Next, task 114 prints a contract or other written record of the working asset assignment. Typically, some degree of responsibility over assigned working asset 26 is taken by the user 28 to whom the working asset 26 has been assigned. The contract or other record may require a signature by the user 28 to indicate acceptance of the terms of the assignment, and these terms may be set forth in the contract or other record. The contract may be printed at printer 36 (FIG. 1). After task 114, program control waits until another assignment is needed.

Figure 6:
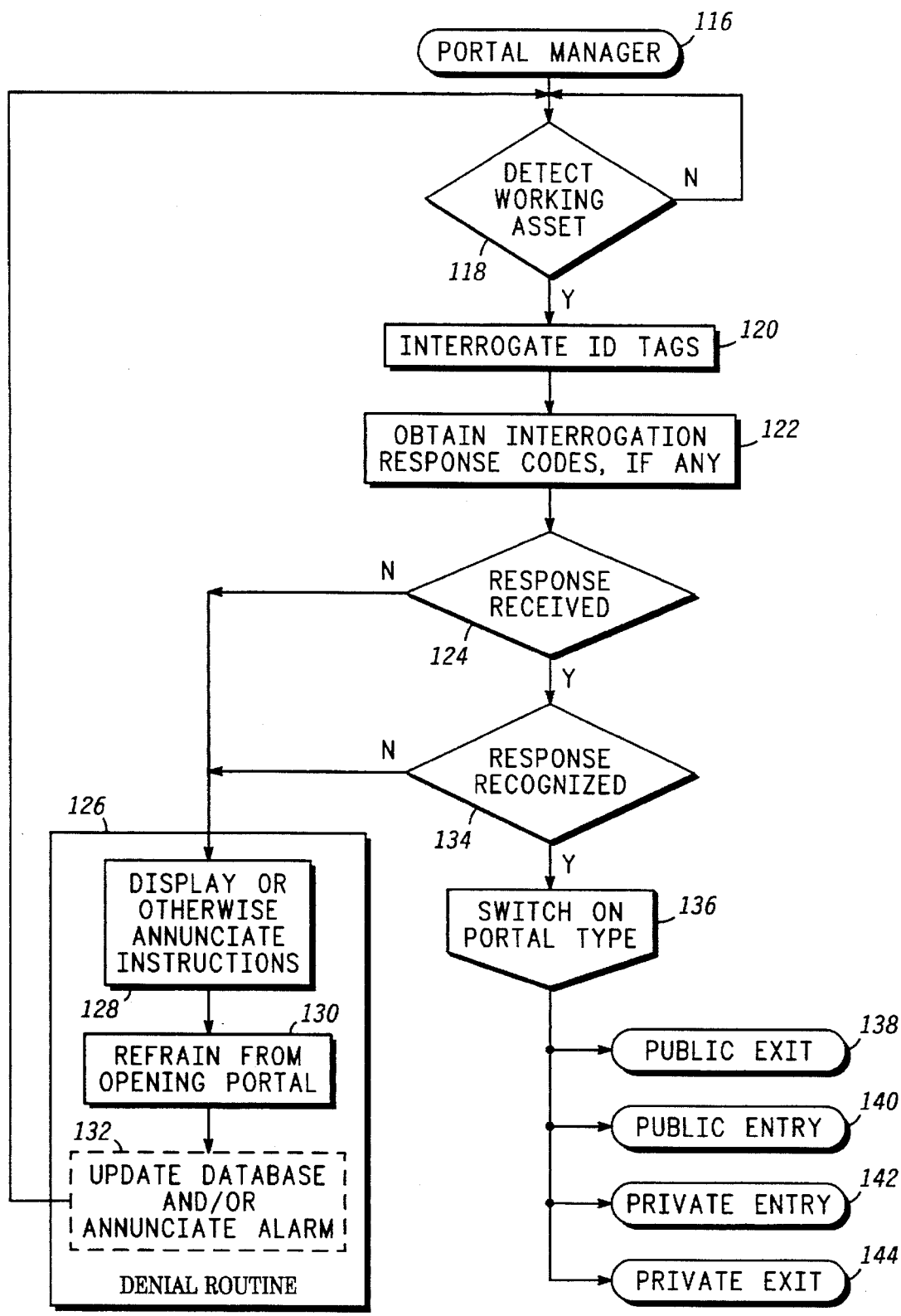
FIG. 6 is a flow chart of a portal manager procedure which is performed when a working asset is detected at a portal.

FIG. 6 is a flow chart of portal manager procedure 116 which is performed when working asset 26 is detected at portal 40, 42, 62 or 64 (FIG. 1). Generally speaking, procedure 116 may be performed under the control of computer 32, which may in turn be controlled via programming instructions in a manner well known to those skilled in the art. Portal manager 116 may operate in a continuous loop (FIG. 6). Program control may remain at query task 118 until working asset 26 is detected at a portal. This detection is performed by the detector 48 portion of the portal manager 46.

When a signal from detector 48 indicates that working asset 26 has been detected in a position that indicates a desire to pass through the portal, task 120 interrogates any ID tags 56 or 58 which may be present to identify the working asset 26. This interrogation takes place in the manner discussed above in connection with FIGS. 2–3. Next, task 122 obtains any interrogation response codes that may be returned in reply to the interrogation. If any response code is returned, it will convey at least an ID code. The response may also indicate use information, capacity information, status information, etc. The response codes may further indicate ID codes for both working asset 26 and caretaker 38.

After task 122, query task 124 determines whether any response was received. No response will be received when, e.g., a non-controlled item had been detected at portal 40, 42, 62 or 64 (FIG. 1). Alternatively, no response may be received when, e.g., tag 56 has failed. In these situations, procedure 116 performs denial routine 126.

Similar versions of denial routine 126 are performed in a variety of circumstances, discussed below. In any of these circumstances, denial routine 126 includes task 128 that displays or otherwise annunciates appropriate instructions at display 52 (FIG. 1) for the subject portal 40, 42, 62 or 64. The instructions that are annunciated are configured to be appropriate for the situation. Thus, if no response is detected at task 124, an appropriate instruction may annunciate verbiage indicating that passage through the portal is being denied, requesting that the portal be cleared, and suggesting that a person may inquire at assignment center 20 if the denial is believed to be improper.

After task 128, task 130 refrains from opening the portal. In other words, steps are taken, if necessary, to prevent gate controller 54 (FIG. 1) from opening gate 44 for the subject portal 40, 42, 62 or 64. After task 130, optional task 132 (dotted-line box, FIG. 6) updates database 94 (FIG. 5) and/or annunciates an appropriate alarm at assignment center 20. Since the portal 40, 42, 62 or 64 will not permit passage therethrough, no significant location change for working asset 26 takes place. However, the denied-passage events may be tracked in database 94 for statistical purposes to determine whether organizational procedures could be improved. Desirably, alarms at assignment center 20 are annunciated only in situations where immediate operator attention may be desirable, such as a possible attempted theft. After task 132, program control exits denial routine 126. If denial routine 126 is being performed because no response was received to an interrogation, program control then returns to task 118 to await the next detection of working asset 26 at portal 40, 42, 62 or 64.

When task 124 determines that a response was received to the interrogation, query task 134 is performed to determine whether the interrogation response codes can be recognized. Task 134 may consult working asset list 96 (FIG. 5) to determine whether any responsive working asset identification code is included therein. Task 134 may consult caretaker list 100 to determine whether any responsive caretaker identification code is included therein. Unrecognizable response codes may be received when, e.g., working asset 26 or caretaker 38 from one organization is attempting to pass through another organization's portal 40, 42, 62 or 64. Generally speaking, when unrecognized response codes are detected at task 134, program control performs denial routine 126 to prevent the passage. However, in alternative embodiments, exceptions may be made to permit entry into staging area 22 or 24 when working asset 26 is recognized but a caretaker is not recognized, or task 134 may alternatively omit examination of caretaker identification codes altogether.

The tasks of portal manager procedure 116 discussed so far are performed regardless of whether an entry or exit portal has been activated or whether a public or private portal has been activated. As configured herein, the subsequent processing depends upon whether portal activation has occurred at public entry portal 40 (FIG. 1), public exit portal 42, private entry portal 62 or private exit portal 64. Accordingly, switching task 136 routes program control to public exit procedure 138, public entry procedure 140, private entry procedure 142 or private exit procedure 144, depending upon which type of portal has been activated.

Figure 7:
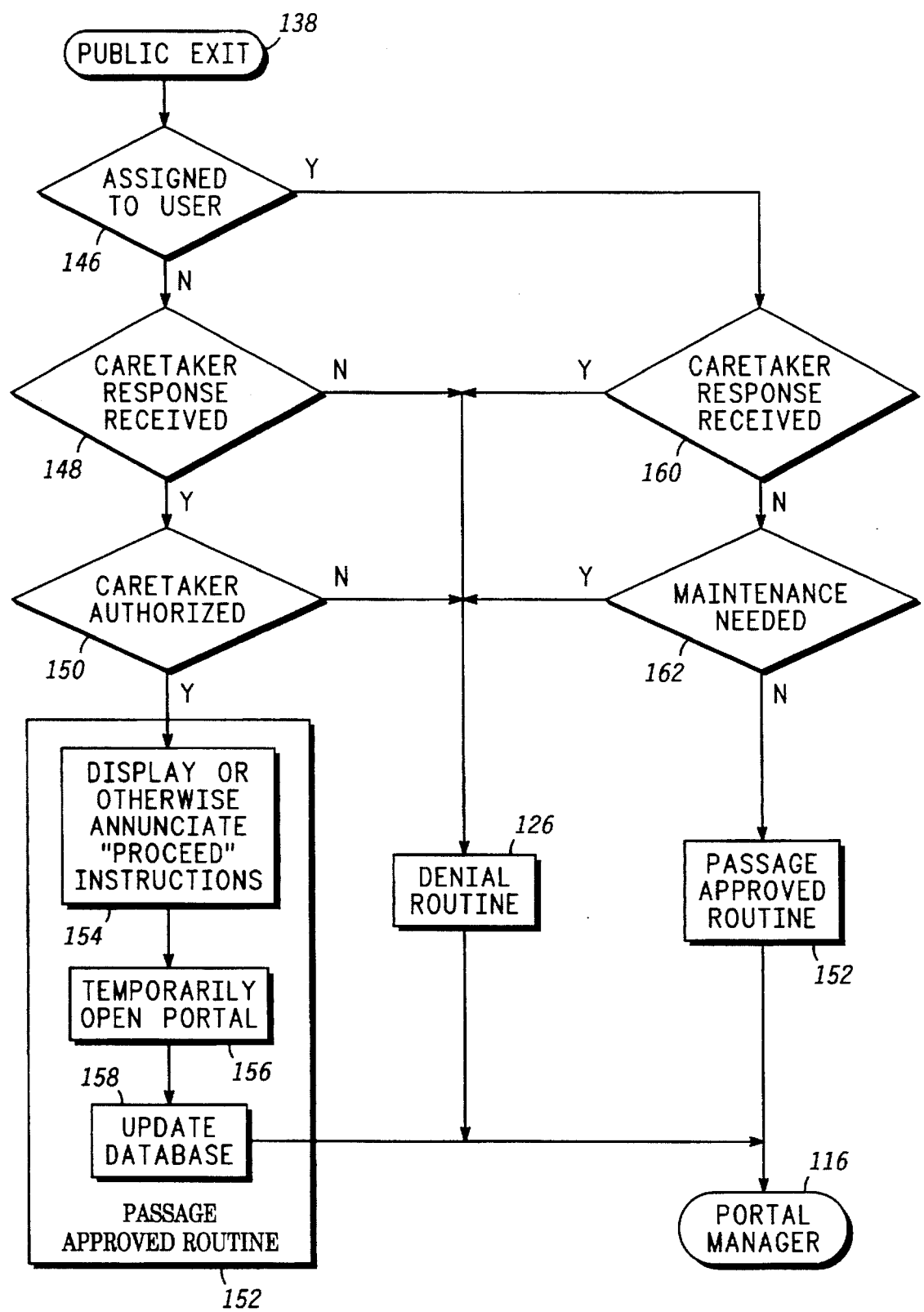
FIG. 7 is a flow chart of a public exit procedure.

FIG. 7 is a flow chart of public exit procedure 138. As indicated above, public exit procedure 138 is performed when a recognized response is obtained from an interrogation at public exit portal 42 (FIG. 1). In other words, procedure 138 is performed when someone is attempting to move controlled working asset 26 out from public staging area 22. Procedure 138 performs query task 146 to determine whether the working asset 26 has been assigned to user 28. Task 146 may examine database 94 (FIG. 5) in making its determination. If the working asset 26 has been assigned to user 28, then the user 28 is most likely simply attempting to remove an asset that has recently been assigned to him or her.

When task 146 determines that the working asset 26 has not been assigned to user 28, query task 148 is performed to determine whether a response from caretaker tag 58 (FIG. 1) was received in reply to the interrogation. If a caretaker tag response was received, then query task 150 determines whether the identified caretaker 38 has been authorized to transport the identified working asset 26 through the public exit portal 42. Task 150 may examine database 94 (FIG. 5) to determine whether such authorization is indicated. If database 94 authorizes the identified caretaker 38 to transport the identified working asset 26 out of public staging area 22, then passage approved routine 152 is performed.

Similar versions of passage approved routine 152 are performed in a variety of circumstances, which are discussed below. In any of these circumstances, passage approved routine 152 includes task 154 which displays or otherwise annunciates appropriate "proceed" instructions at display 52 (FIG. 1) for the portal. Generally speaking, the proceed instructions indicate that passage through the portal has been approved and that the person receiving the instructions should proceed through the portal with working asset 26. Of course, other instructions appropriate to the circumstances may also be annunciated (e.g., instructions may inform caretaker 38 which other staging areas 22 or 24 are authorized to receive working asset 26).

After task 154, task 156 temporarily opens the portal. The portal may be opened by sending appropriate commands to gate controller 54 (FIG. 1). As discussed above, the portal is configured, either alone or in cooperation with computer 32, to close the portal after working asset 26 has passed therethrough. Thus, the portal remains in a normally closed state.

After task 156, task 158 is performed to update database 94 (FIG. 5). Specifically, database 94 may be adjusted to reflect an "out-of-lot" location when passage approved routine 152 is performed for exit portals 42 or 64 (FIG. 1), and database 94 may be adjusted to reflect particular staging area 22 or 24 location for working asset 26 when routine 152 is performed for entry portals 40 or 62. After task 158, program control leaves passage approved routine 152. When routine 152 is performed because authorized caretaker 38 is transporting controlled working asset 26 out from public staging area 22, program control returns to portal manager procedure 116 upon leaving routine 152.

Referring back to task 146, when task 146 determines that recognized working asset 26 at public exit portal 42 (FIG. 1) has been assigned to user 28, query task 160 is performed. Task 160 determines whether a caretaker response was also received in reply to the interrogation. In other words, task 160 determines whether caretaker 38 is attempting to remove working asset 26 assigned to user 28. This situation may occur when user 28 has not yet taken possession of working asset 26 after it has been assigned to him or her. Caretaker 38 may have such working asset 26 by mistake or for legitimate reasons. When a caretaker response is received where the working asset 26 has been assigned to user 28, denial routine 126 is performed to prevent passage through public exit portal 42. An appropriate message to be displayed during routine 126 might indicate that the working asset 26 has been assigned to user 28.

Referring back to task 148, when task 148 determines that recognized working asset 26 at public exit portal 42 (FIG. 1) has not been assigned to user 28 and no caretaker response was received, a possible theft situation is indicated. Thus, program control is routed to perform denial routine 126 to prevent passage through public exit portal 42. In this situation, denial routine 126 may cause an alarm to be annunciated at assignment center 20.

Referring back to task 150, when task 150 determines that recognized caretaker 38 is not authorized to take recognized working asset 26 out at public exit portal 42 (FIG. 1), passage is again denied through the performance of denial routine 126. This situation may, e.g., occur when caretaker 38 mistakenly takes working asset 26 other than one he or she is scheduled to take. An appropriate message to be displayed during routine 126 might indicate that the caretaker 38 is not authorized to remove this particular working asset 26.

Referring back to task 160, when working asset 26 is assigned to user 28 and no caretaker response is received, query task 162 is performed. Task 162 determines whether maintenance may be needed on the working asset. Task 162 may make its determination by examining operational status information from the interrogation response obtained from the working asset 26. As discussed above in connection with FIGS. 2-3, this status information may originate from on-board computer 78 (FIG. 2) that monitors operational status of working asset 26 or that performs diagnostic tests on working asset 26. If the operational status information indicates that maintenance is needed, passage through public exit portal 42 (FIG. 1) is again denied by performing denial routine 126. An appropriate message to display during denial routine 126 might indicate that a malfunction has been detected and that user 28 should return to assignment center 20 to obtain another working asset 26 that functions properly.

When task 162 determines from examining operational status information that no maintenance is needed, passage approved routine 152 is performed to permit passage through public exit portal 42 (FIG. 1). This is the normal situation when user 28 has just been assigned working asset 26 and is removing the working asset 26 from public staging area 22. After performing routine 152, program control returns to portal manager procedure 116.

Figure 8:
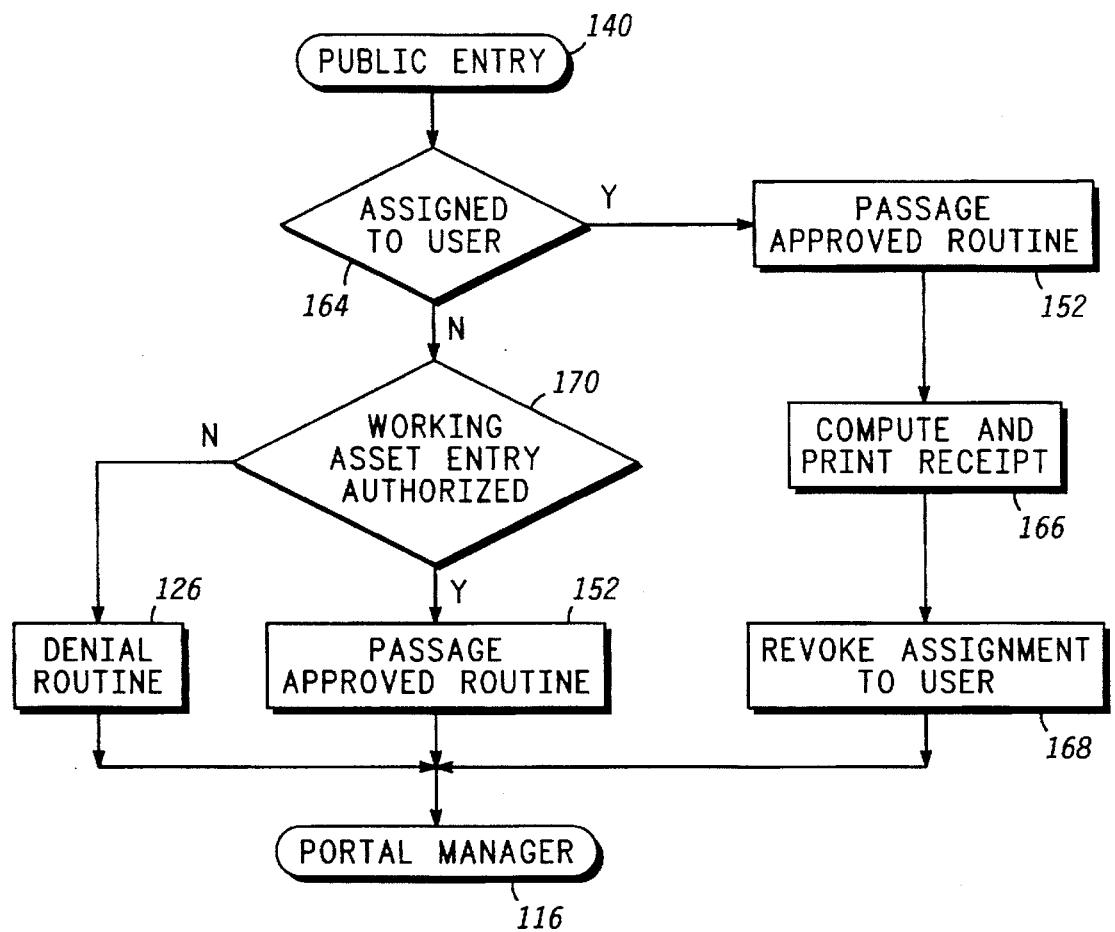
FIG. 8 is a flow chart of a public entry procedure.

FIG. 8 is a flow chart of public entry procedure 140. As indicated above, public entry procedure 140 is performed when a recognized response is obtained from an interrogation at public entry portal 40 (FIG. 1). In other words, procedure 140 is performed when someone is attempting to move controlled working asset 26 into public staging area 22. Procedure 140 performs query task 164 to determine whether working asset 26 has been assigned to user 28. Task 164 may examine database 94 (FIG. 5) in making its determination. If working asset 26 has been assigned to user 28, then user 28 may be attempting to return working asset 26 assigned to him or her.

When task 164 determines that working asset 26 is assigned to user 28, passage approved routine 152 (FIG. 7) is performed to permit working asset 26 to enter public staging area 22 (FIG. 1). After routine 152, task 166 computes and prints a receipt or other record of the return of working asset 26. This receipt or other record may desirably be printed at printer 60, located in or near public staging area 22. The calculations indicated in the receipt may rely upon the mileage or other quantity of use information and the fuel or other capacity information obtained in response to the interrogation discussed above in connection with FIGS. 2–3. In addition, credit card verifications and authorizations may be performed during task 166, and credit card accounts automatically charged. Appropriate instructions displayed during passage approved routine 152, performed prior to task 166, may indicate that user 28 may proceed to printer 60 to collect this receipt for a fast check-in procedure. If user 28 has any questions or needs additional service, user 28 may return to assignment center 20.

After task 166, task 168 revokes the assignment of working asset 26 to user 28 by updating database 94 (FIG. 5). Database 94 may be adjusted to reflect a location for working asset 26 in public staging area 22 but no association of working asset 26 with user 28. After task 168, program control may return to portal manager procedure 116 (FIG. 6).

Referring back to task 164, when task 164 determines that working asset 26 is not assigned to user 28, query task 170 is performed to determine whether entry of working asset 26 into public staging area 22 is authorized. Generally speaking, an organization may desire task 170 to favor permitting passage of its working assets into public staging area 22 (FIG. 1). Thus, regardless of the reason a working asset is outside area 22, it may easily be returned to the security and control of area 22. Thus, task 170 tends to determine that entry is authorized unless specific situations indicate otherwise. When entry is authorized, passage approved routine 152 is again performed to permit working asset 26 to enter. After completion of routine 152, program control returns to portal manager procedure 116 (FIG. 6).

One situation in which task 170 may decide that entry to public staging area 22 (FIG. 1) is not permitted occurs when caretaker 38 is attempting to transport working asset 26 into one staging area, but working asset 26 has been scheduled for another staging area. This situation may occur when the caretaker 38 misunderstands instructions about where to take which working assets 26. This situation may be detected by determining that a caretaker response has been received to the interrogation and by examining location and authorization information associated with working asset 26. In this situation, denial routine 126 may be performed to prevent passage into public staging area 22. An appropriate message to display during denial routine 126 may indicate that passage is being denied and that working asset 26 is scheduled for location in a different staging area. After performing denial routine 126, program control returns to portal manager routine 116.

Figure 9:
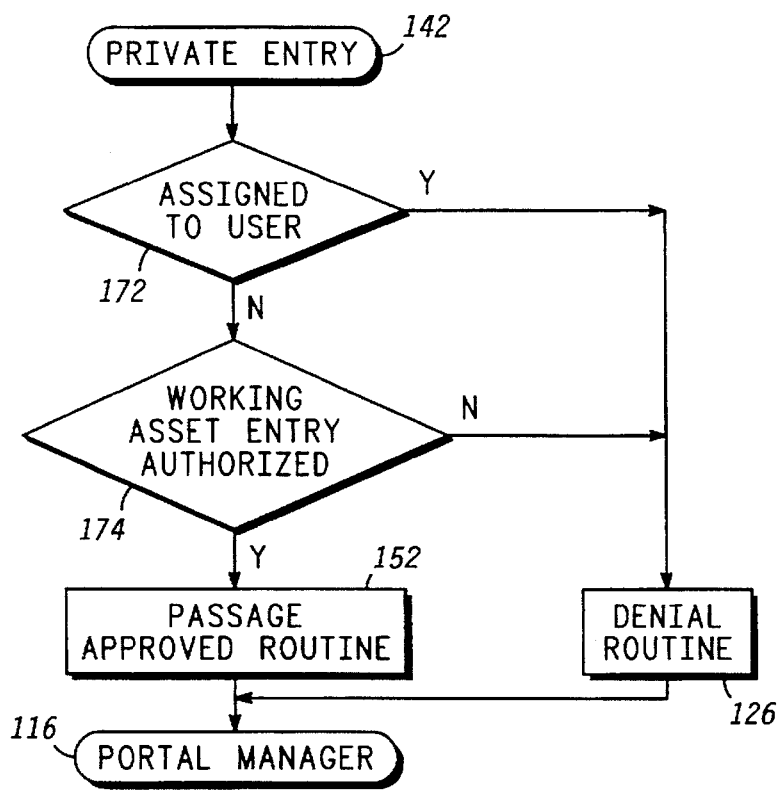
FIG. 9 is a flow chart of a private entry procedure.

FIG. 9 is a flow chart of private entry procedure 142. As indicated above, private entry procedure 142 is performed when a recognized response is obtained from an interrogation at private entry portal 62 (FIG. 1). In other words, procedure 142 is performed when someone is attempting to move controlled working asset 26 into private staging area 24. Procedure 142 performs query task 172 to determine whether working asset 26 has been assigned to user 28. Task 172 may examine database 94 (FIG. 5) in making its determination. If working asset 26 has been assigned to user 28, then user 28 may be attempting to return working asset 26 to an inappropriate staging area, or caretaker 38 may have somehow obtained working asset 26 assigned to user 28.

When task 172 determines that the working asset has been assigned to user 28, denial routine 126 is performed to deny access to private staging area 24 (FIG. 1). An appropriate message may indicate where working asset 26 should be returned. After denial routine 126, program control returns to portal manager procedure 116.

When task 172 determines that working asset 26 has not been assigned to user 28, query task 174 is performed. Task 174 determines whether working asset entry into private staging area 24 (FIG. 1) is authorized. Task 174 may consult database 94 (FIG. 5) in making this determination. As discussed above in connection with procedure 140 (FIG. 8), an organization may desire task 174 to favor permitting passage of its working assets into private staging area 24. Thus, regardless of the reason a working asset is outside area 24, it may easily be returned to the security and control of area 24. Consequently, task 174 may tend to determine that entry is authorized unless specific situations indicate otherwise. When entry is authorized, passage approved routine 152 is again performed to permit working asset 26 to enter. After completion of routine 152, program control returns to portal manager procedure 116.

One situation in which task 174 may decide that entry to private staging area 24 (FIG. 1) is not permitted occurs when caretaker 38 is attempting to transport working asset 26 into one staging area when working asset 26 is scheduled to be located in another staging area. This situation may occur when caretaker 38 misunderstands instructions about where to take which working assets 26. This situation may be detected by determining that a caretaker response has been received to the interrogation and by examining location and authorization information associated with working asset 26. In this situation, denial routine 126 may be performed to prevent passage into private staging area 24. An appropriate message to display during denial routine 126 may indicate that the passage is being denied and that working asset 26 is scheduled for location in a different staging area. After performing denial routine 126, program control returns to portal manager procedure 116.

Figure 10:
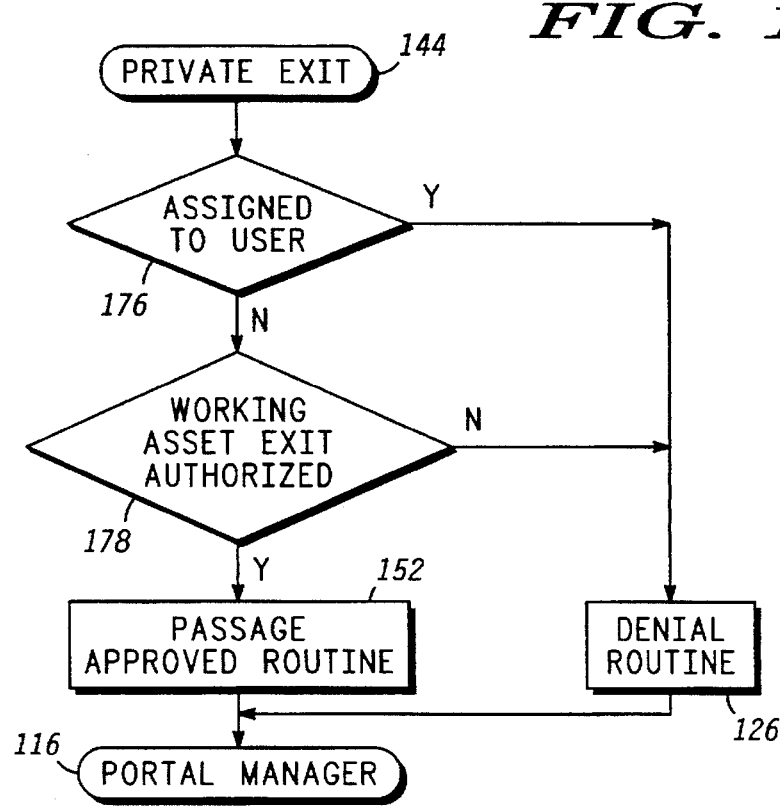
FIG. 10 is a flow chart of a private exit procedure.

FIG. 10 is a flow chart of private exit procedure 144. As indicated above, private exit procedure 144 is performed when a recognized response is obtained from an interrogation at private exit portal 64 (FIG. 1). In other words, procedure 144 is performed when someone is attempting to move controlled working asset 26 out of private staging area 24. Procedure 144 performs query task 176 to determine whether working asset 26 has been assigned to user 28. Task 176 may examine database 94 (FIG. 5) in making its determination. If working asset 26 has been assigned to user 28, then some sort of mistake has occurred because assignments should be made from public staging area 22. In this situation, denial routine 126 is performed, and an appropriate message may urge the person transporting the working asset to correct the mistake. After completion of denial routine 126, program control returns to portal manager procedure 116.

When task 176 determines that working asset 26 has not been assigned to user 28, query task 178 is performed. Task 178 determines whether a working asset exit from private staging area 24 (FIG. 1) is authorized. Task 174 may consult database 94 (FIG. 5) in making this determination. Generally speaking, exit from private staging area 24 is denied if no caretaker response is received to the interrogation. This indicates a possible theft situation. When a caretaker response is received, caretaker authorizations recorded in database 94 may be examined to indicate whether to permit removal of working asset 26. If no caretaker response is received, or if a caretaker response is received but caretaker 38 is not authorized to take working asset 26 out of private staging area 24, then denial routine 126 is performed to prevent the passage of working asset 26 through private exit portal 64.

If a caretaker response is received and task 178 determines that caretaker 38 is authorized to remove working asset 26, then passage approved routine 152 is perform to permit passage. After either of routines 126 or 152, program control returns to portal manager procedure 116.

In summary, the present invention provides an improved method and system for managing working assets. ID tags are attached to working assets to automatically communicate information, such as identity, use, capacity, and operational status, which is recorded with other information in a database. This information is provided when a working asset enters or leaves any of various staging areas. Working assets are tracked through staging area portals. Thus, an inventory of such working assets may be tightly controlled. This allows the database to maintain current and accurate data concerning the working assets, their status, and their locations. Such database information may be used in numerous ways known to those skilled in the art to efficiently manage the working assets. For example, the most popular working assets may be given priority in receiving clean-up services or other maintenance, and their availability for subsequent use is instantly noted in the database. Moreover, exit from and entry into various staging areas may be controlled to minimize mistakes and misplacement by caretakers in performing a variety of services in connection with a variety of working assets.

The present invention respects a working asset user's time. For example, working assets which may be in need of maintenance are detected and prevented from leaving a staging area so that a user is less likely to face a malfunction. Likewise, a quick check-in procedure is provided by automatically obtaining use and capacity information from the working asset upon return and printing a receipt locally. Moreover, the automated detection of this use and capacity information reduces errors caused by human procedures.

The present invention also improves security for working assets. Before working assets may exit a staging area, the assets are specifically authorized to do so. An authorization may result from assigning the working asset to a user or by authorizing particular caretakers to transport particular working assets. If ID tags fail to respond to an interrogation, as might occur when they are disabled or otherwise tampered with, an exit is prevented. The system and method of the present invention denies all but specifically authorized exits. This technique contrasts with conventional techniques that permit all exits unless special security devices are attached and properly operating. Security improves over the conventional techniques because the opportunities for defeating or deceiving the security provisions are greatly reduced.

The present invention has been described above with reference to preferred embodiments. However, those skilled in the art will recognize that changes and modifications may be made in these preferred embodiments without departing from the scope of the present invention. Those skilled in the art may adapt the present invention to a wide assortment of staging areas. Multiple public and private staging areas may be accommodated, and separate staging areas can be provided for check-out and return. In addition, those skilled in the art will appreciate that the present invention permits great flexibility in hardware implementation and software programming techniques. These and other changes and modifications which are obvious to those skilled in the art are intended to be included within the scope of the present invention.

What is claimed is:

1. A method of operating an identification tag including a processor and a memory coupled to said processor, to control an inventory of monitored working assets, said method comprising steps of:

coupling a monitoring system for one of said working assets to said tag;

obtaining use information from said monitoring system, said use information describing a quantity of use experienced by said one working asset;

receiving an interrogation signal;

storing, by said processor, data in said memory in response to instructions contained in said interrogation signal; and transmitting, in response to said interrogation signal, said use information.

2. A method as claimed in claim 1 wherein:

said method additionally comprises a step of obtaining capacity information from said monitoring system, said capacity information describing a capacity for holding a consumable commodity used by said one working asset; and said transmitting step additionally transmits said capacity information.

3. A method as claimed in claim 2 wherein:

said one working asset is a motor vehicle that uses energy to travel;

said use information identifies distance traveled by said vehicle; and said capacity information identifies energy available in said vehicle for use in traveling.

4. A method as claimed in claim 2 wherein:

said one working asset is a motor vehicle that uses electrical energy for causing the motor vehicle to travel;

said use information identifies duration of operation by said vehicle; and said capacity information identifies electrical energy available in said vehicle for use in traveling.

5. A method as claimed in claim 1 wherein:

said method additionally comprises a step of obtaining operational status information from said monitoring system, said operational status information indicating whether said one working asset is in need of maintenance; and said transmitting step additionally transmits said operational status information.

6. A method as claimed in claim 54 wherein:

said one working asset is a motor vehicle;

said use information identifies distance traveled by said vehicle; and said operational status information identifies whether said vehicle is in need of maintenance.

7. A method as claimed in claim 1 wherein:

said receiving step detects a radio frequency (RF) signal; and said transmitting step responds to said RF signal to communicate an identifying code and said use information.

8. A method as claimed in claim 1 wherein said storing step includes a step of storing data contained in said interrogation signal in said memory.

9. A method as claimed in claim 1 wherein said storing step includes a step of storing said use information in said memory.

10. A method as claimed in claim 7 wherein said interrogating step includes steps of:

transmitting a first radio frequency signal from an interrogator positioned proximate said portal;

receiving a second radio frequency signal from said tag, said second radio frequency signal including identification information and use information; and transmitting a third radio frequency signal from said interrogator, said third radio frequency signal including an instruction to write data to a memory contained in said one of said plurality of identification tags.

11. A method as claimed in claim 10, wherein said step of transmitting a third radio frequency signal includes a step of transmitting data to be written to said memory contained in said one of said plurality of identification tags.

12. A method as claimed in claim 10, wherein said step of transmitting a third radio frequency signal includes a step of transmitting an instruction to write said use information to said memory contained in said one of said plurality of identification tags.

13. A method of controlling an inventory of working assets, said method comprising steps of:

physically associating each of a plurality of identification tags with each working asset in said inventory of working assets such that each of said plurality of identification tags corresponds to, and provides identification for, a particular working asset;

locating at least a portion of said inventory in a staging area having a normally closed portal;

assigning a selected one of said working assets to a user;

interrogating one of said plurality of identification tags, said one of said plurality of identification tags associated with a working asset positioned at said portal, to identify said working asset;

updating a database in a computer to describe a new location for said selected one of said working assets, said database describing locations of said working assets; and temporarily opening said portal when said working asset at said portal is said selected one of said working assets.

14. A method as claimed in claim 13 additionally comprising, prior to said interrogating step, a step of detecting the presence of said working asset positioned at said portal.

15. A method as claimed in claim 14 additionally comprising a step of refraining from opening said portal when said interrogating step does not obtain a response from said tag.

16. A method as claimed in claim 13 additionally comprising steps of:

associating a caretaker tag with a caretaker;

authorizing said caretaker to transport one or more of authorized ones of said working assets through said portal;

interrogating said caretaker tag; and temporarily opening said portal when said working asset at said portal is an authorized one of said working assets.

17. A method as claimed in claim 16 additionally comprising a step, in response to said assigning step, of preventing said selected one of said working assets from being one of said authorized assets.

18. A method as claimed in claim 10 additionally comprising a step of refraining from opening said portal when said caretaker tag interrogating step does not obtain a response from said interrogated caretaker tag or when said working asset at said portal is not an authorized one of said working assets.

19. A method as claimed in claim 13 additionally comprising steps of:

maintaining a list of unique identifying codes associated with said working assets of said inventory;

obtaining an interrogation response code in response to said interrogating step; and refraining from opening said portal when said interrogation response code does not correspond to one of said unique identifying codes from said list.

20. A method as claimed in claim 7 additionally comprising steps of:

maintaining a list of unique identifying codes associated with said working assets of said inventory;

locating a first detector to detect the presence of working assets positioned to exit said staging area, said first detector providing a signal to which said interrogating step responds;

locating a second detector to detect the presence of working assets positioned to enter said staging area;

obtaining an interrogation response code in response to a signal provided by said second detector; and preventing entry into said staging area when said interrogation response code does not correspond to one of said unique identifying codes from said list.

21. A method as claimed in claim 13 wherein said interrogating step comprises a step of transmitting a first radio frequency (RF) signal from an interrogator positioned proximate said portal, and said method additionally comprises steps of:

receiving said RF signal at said tag; and responding to said RF signal at said tag to communicate a unique identifying code.

22. A method as claimed in claim 13 wherein at least a chosen one of said working assets has a monitoring system, and said method additionally comprises steps of:

electrically coupling said monitoring system to a chosen one of said tags, said chosen tag being associated with said chosen one of said working assets;

obtaining use information at said chosen tag from said monitoring system, said use information describing a quantity of use experienced by said chosen one of said working assets; and communicating said use information from said chosen tag in response to said interrogation step.

23. A method as claimed in claim 22 additionally comprising a step of printing a receipt bearing information compiled in response to said use information.

24. A method as claimed in claim 22 wherein:

said chosen one of said working assets is a motor vehicle; and said use information identifies distance traveled by said vehicle.

25. A method as claimed in claim 13 wherein at least a chosen one of said working assets has a monitoring system, and said method additionally comprises steps of:

electrically coupling said monitoring system to a chosen one of said tags, said chosen tag being associated with said chosen one of said working assets;

obtaining capacity information at said chosen tag from said monitoring system, said capacity information describing a capacity for holding a consumable commodity used by said chosen one of said working assets; and communicating said capacity information from said chosen tag in response to said interrogation step.

26. A method as claimed in claim 13 wherein at least a chosen one of said working assets has a monitoring system, and said method additionally comprises steps of:

electrically coupling said monitoring system to a chosen one of said tags, said chosen tag being associated with said chosen one of said working assets;

obtaining operational status information at said chosen tag from said monitoring system, said operational status information indicating whether said chosen one of said working assets is in need of maintenance; and communicating said operational status information from said chosen tag in response to said interrogation step.

27. A method as claimed in claim 20 wherein:

said interrogating step is configured to interrogate one of said tags associated with a working asset positioned to exit said staging area at said portal; and said method additionally comprises a step of refraining from opening said portal when said operational status information communicated in said communicating step indicates that said chosen working asset is in need of maintenance.

28. A method as claimed in claim 13 additionally comprising, in response to said interrogating step, a step of annunciating instructions proximate said portal, said instructions being perceivable by said user.

29. A method as claimed in claim 13 additionally comprising steps of:

locating a second portion of said inventory in a second staging area;

detecting the presence of a working asset positioned to enter or exit said second staging area;

interrogating one of said tags, said one tag being associated with said working asset positioned to enter or exit said second staging area;

selectively controlling passage into or out of said second staging area by said working asset positioned to enter or exit said second staging area in response to said interrogating step;

adjusting location information included in a database when said passage is permitted; and annunciating instructions when said passage is denied.

30. A method as claimed in claim 13, wherein said updating step includes a step of describing future locations where said selected one of said working assets is permitted to go.

31. A method as claimed in claim 30, wherein said updating step includes a step of including a time stamp in said database.

32. A system for controlling an inventory of working assets, said system comprising:

a plurality of identification tags wherein each tag is physically and uniquely associated with a working asset from said inventory of working assets;

a normally closed portal configured to selectively control passage into or out from a staging area, said staging area holding at least a portion of said inventory of working assets;

a processor for assigning a selected one of said working assets to a user;

an interrogator, positioned proximate said portal, for interrogating one of said tags associated with a working asset positioned at said portal to identify said working asset positioned at said portal;

memory means coupled to said processor, said memory means for storing data in response to interrogation signals from said interrogator; and means, coupled to said interrogator and said processor, for temporarily opening said portal when said working asset at said portal is said selected one of said working assets.

33. A system as claimed in claim 32 additionally comprising a detector coupled to said interrogator, said detector for detecting the presence of working assets positioned at said portal.

34. A system as claimed in claim 33 wherein said opening means is configured to refrain from opening said portal when said interrogator does not obtain a response from said tag.

35. A system as claimed in claim 32 wherein:

said system additionally comprises means, coupled to one or more of said processor, interrogator, and opening means, for maintaining a database including unique identification codes associated with said working assets of said inventory; and said opening means is configured to refrain from opening said portal when said interrogator obtains an interrogation response code that does not correspond to one of said unique identifying codes from said list.

36. A system as claimed in claim 32 wherein said identification tags are configured to communicate with said interrogater using radio frequency (RF) communication.

37. A system as claimed in claim 32 wherein:

said system additionally comprises a monitoring system associated with at least a chosen one of said working assets, said monitoring system being electrically coupled to a chosen one of said tags, said chosen tag being associated with said chosen one of said working assets;

said chosen tag is configured to obtain use information from said monitoring system, said use information describing a quantity of use experienced by said chosen one of said working assets; and said chosen tag is configured to communicate said use information to said interrogator.

38. A system as claimed in claim 37 additionally comprising means, coupled to said interrogator, for printing a receipt bearing information compiled in response to said use information.

39. A system as claimed in claim 32 wherein:

said system additionally comprises a monitoring system associated with at least a chosen one of said working assets, said monitoring system being electrically coupled to a chosen one of said tags, said chosen tag being associated with said chosen one of said working assets;

said chosen tag is configured to obtain capacity information from said monitoring system, said capacity information describing a capacity for holding a consumable commodity used by said chosen one of said working assets; and said chosen tag is configured to communicate said capacity information to said interrogator.

40. A system as claimed in claim 32 wherein:

said system additionally comprises a monitoring system associated with at least a chosen one of said working assets, said monitoring system being electrically coupled to a chosen one of said tags, said chosen tag being associated with said chosen one of said working assets;

said chosen tag is configured to obtain operational status information from said monitoring system, said operational status information indicating whether said chosen one of said working assets is in need of maintenance; and said chosen tag is configured to communicate said operational status information to said interrogator.

41. A system as claimed in claim 32 additionally comprising means, located proximate said portal and coupled to one or more of said processor, interrogator and opening means, for annunciating instructions to said user.

42. A system as claimed in claim 32 additionally comprising:
- a second staging area configured to hold a second portion of said inventory;
- a detector located proximate said second staging area and being configured to detect the presence of a working asset positioned to enter or exit said second staging area;
- a second interrogator located proximate said second staging area and being configured to interrogate one of said tags associated with said working asset positioned to enter or exit said second staging area and to provide an interrogation signal;
- means, coupled to said second interrogator, for selectively controlling passage into or out of said second staging area by said working asset positioned to enter or exit said second staging area in response to said interrogation signal;
- memory means, coupled to said selectively controlling means, for recording a database having location information for said working asset positioned to enter or exit said second staging area, said location information being adjusted when said entry or exit is permitted; and
- means, coupled to said selectively controlling means, for annunciating instructions when said entry or exit is denied.

43. A system as claimed in claim 32, wherein said processor and said interrogator are configured for:
- transmitting a first radio frequency signal from said interrogator positioned proximate said portal;
- receiving a second radio frequency signal from said one of said tags associated with a working asset positioned at said portal in response to said first radio frequency signal, said second radio frequency signal including identification information and use information; and
- transmitting a third radio frequency signal from said interrogator, said third radio frequency signal including an instruction to write data to a memory contained in said one of said tags associated with a working asset positioned at said portal.

44. A method of controlling an inventory of working assets, said method comprising steps of:
- physically associating each of a plurality of identification tags with each working asset in said inventory of working assets such that each of said plurality of identification tags corresponds to, and provides identification for, a particular working asset;
- locating at least a portion of said inventory in a staging area having a normally closed portal;
- assigning a selected one of said working assets to a user;
- detecting the presence of said working asset positioned at said portal;
- interrogating one of said plurality of identification tags, said one of said plurality of identification tags associated with a working asset positioned at said portal, to identify said working asset;
- updating a database in a computer to describe a new location for said selected one of said working assets, said database describing locations of said working assets;
- refraining from opening said portal when said interrogating step does not obtain a response from said tag;
- temporarily opening said portal when said working asset at said portal is said selected one of said working assets;
- maintaining a list of unique identifying codes associated with said working assets of said inventory;
- obtaining an interrogation response code in response to said interrogating step;
- refraining from opening said portal when said interrogation response code does not correspond to one of said unique identifying codes from said list;
- locating a first detector to detect the presence of working assets positioned to exit said staging area, said first detector providing a signal to which said interrogating step responds;
- locating a second detector to detect the presence of working assets positioned to enter said staging area;
- obtaining an interrogation response code in response to a signal provided by said second detector; and
- preventing entry into said staging area when said interrogation response code does not correspond to one of said unique identifying codes from said list, wherein said method also includes steps of:
- associating a caretaker tag with a caretaker;
- authorizing said caretaker to transport one or more of authorized ones of said working assets through said portal;
- interrogating said caretaker tag;
- temporarily opening said portal when said working asset at said portal is an authorized one of said working assets;
- preventing, in response to said assigning step, said selected one of said working assets from being one of said authorized assets; and
- refraining from opening said portal when said caretaker tag interrogating step does not obtain a response from said interrogated caretaker tag or when said working asset at said portal is not an authorized one of said working assets, wherein at least a chosen one of said working assets has a monitoring system, and said method additionally comprises steps of:
- electrically coupling said monitoring system to a chosen one of said tags, said chosen tag being associated with said chosen one of said working assets, said chosen one of said working assets comprising a motor vehicle;
- obtaining use information at said chosen tag from said monitoring system, said use information describing a quantity of use experienced by said chosen one of said working assets, said use information including identification of a distance traveled by said vehicle;
- communicating said use information from said chosen tag in response to said interrogation step;
- obtaining operational status information at said chosen tag from said monitoring system, said operational status information indicating whether said chosen one of said working assets is in need of maintenance; and
- communicating said operational status information from said chosen tag in response to said interrogation step, wherein:

said interrogating step is configured to interrogate one of said tags associated with a working asset positioned to exit said staging area at said portal; and said method additionally comprises a step of refraining from opening said portal when said operational status information communicated in said communicating step indicates that said chosen working asset is in need of maintenance, and wherein said method additionally comprises steps of:

locating a second portion of said inventory in a second staging area;

detecting the presence of a working asset positioned to enter or exit said second staging area;

interrogating one of said tags, said one tag being associated with said working asset positioned to enter or exit said second staging area;

selectively controlling passage into or out of said second staging area by said working asset positioned to enter or exit said second staging area in response to said interrogating step;

adjusting location information included in a database when said passage is permitted; and annunciating instructions when said passage is denied.

* * * * *